July 16, 1929. G. FORTIN 1,721,013
LOCKING DEVICE FOR AUTOMOBILES
Filed Sept. 2, 1926 3 Sheets-Sheet 2
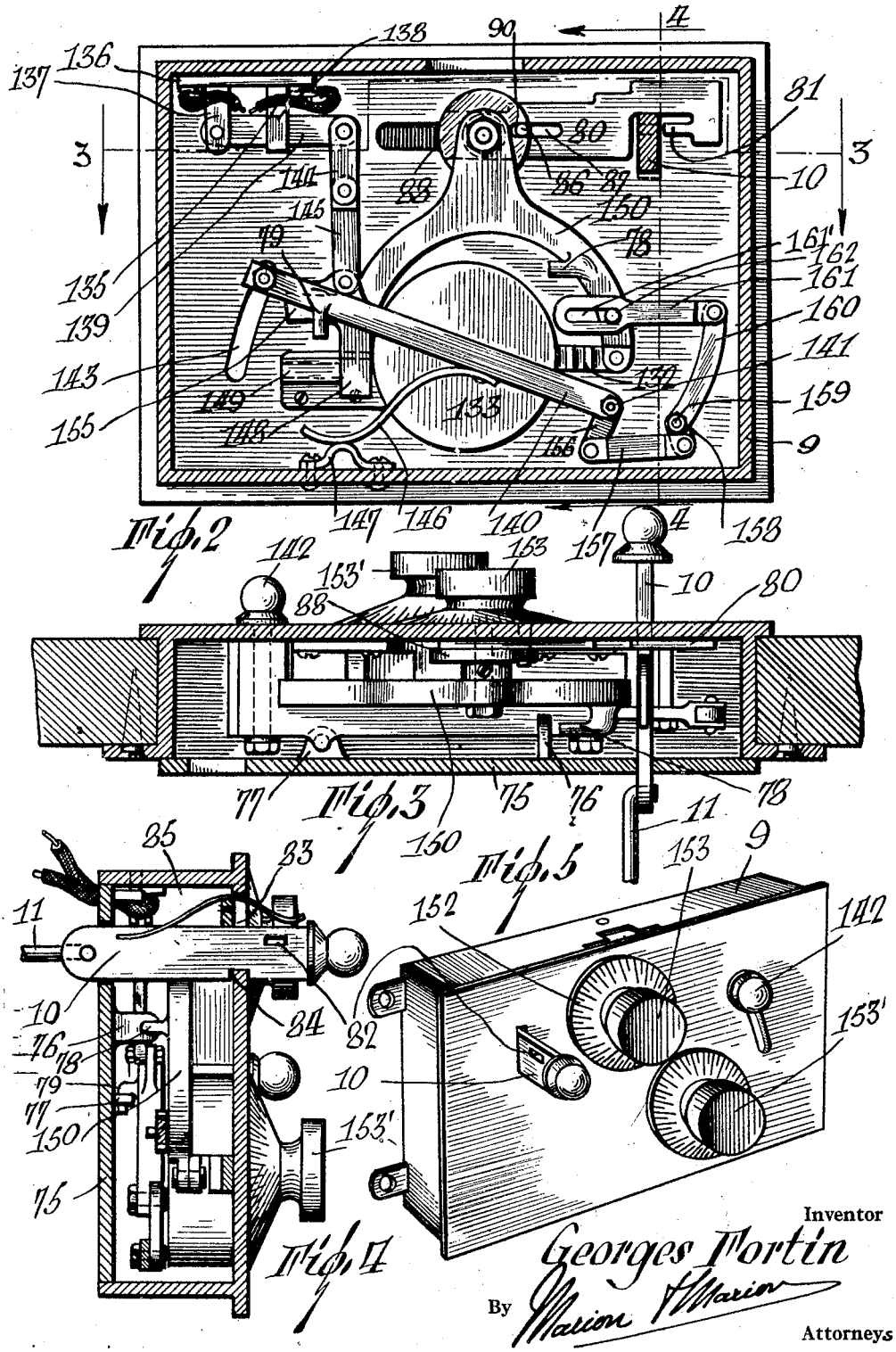
Inventor
Georges Fortin
By Marion & Marion
Attorneys July 16, 1929.  G. FORTIN  1,721,013
LOCKING DEVICE FOR AUTOMOBILES
Filed Sept. 2, 1926  3 Sheets-Sheet 3
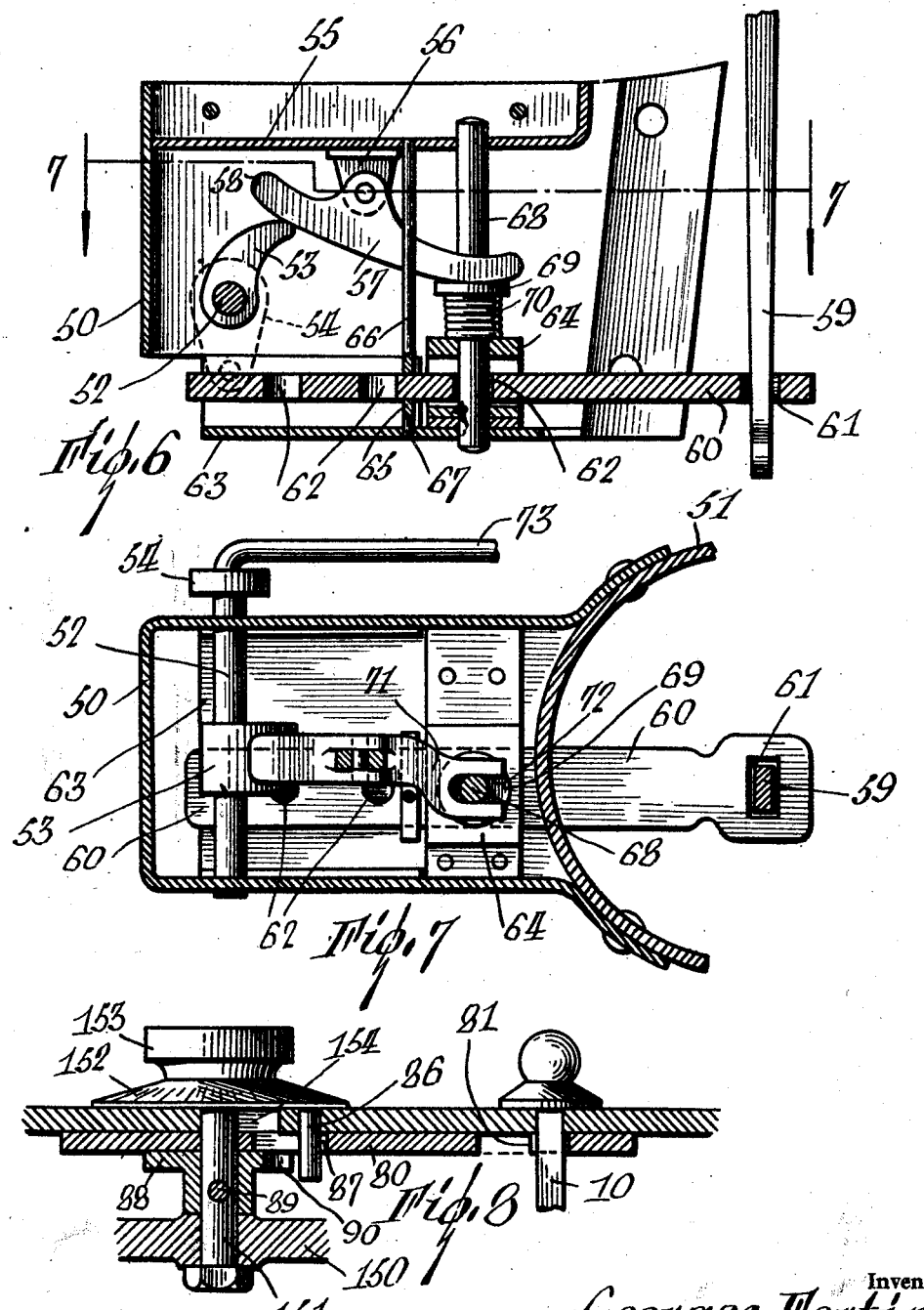
Inventor
Georges Fortin
By
Attorneys Patented July 16, 1929.

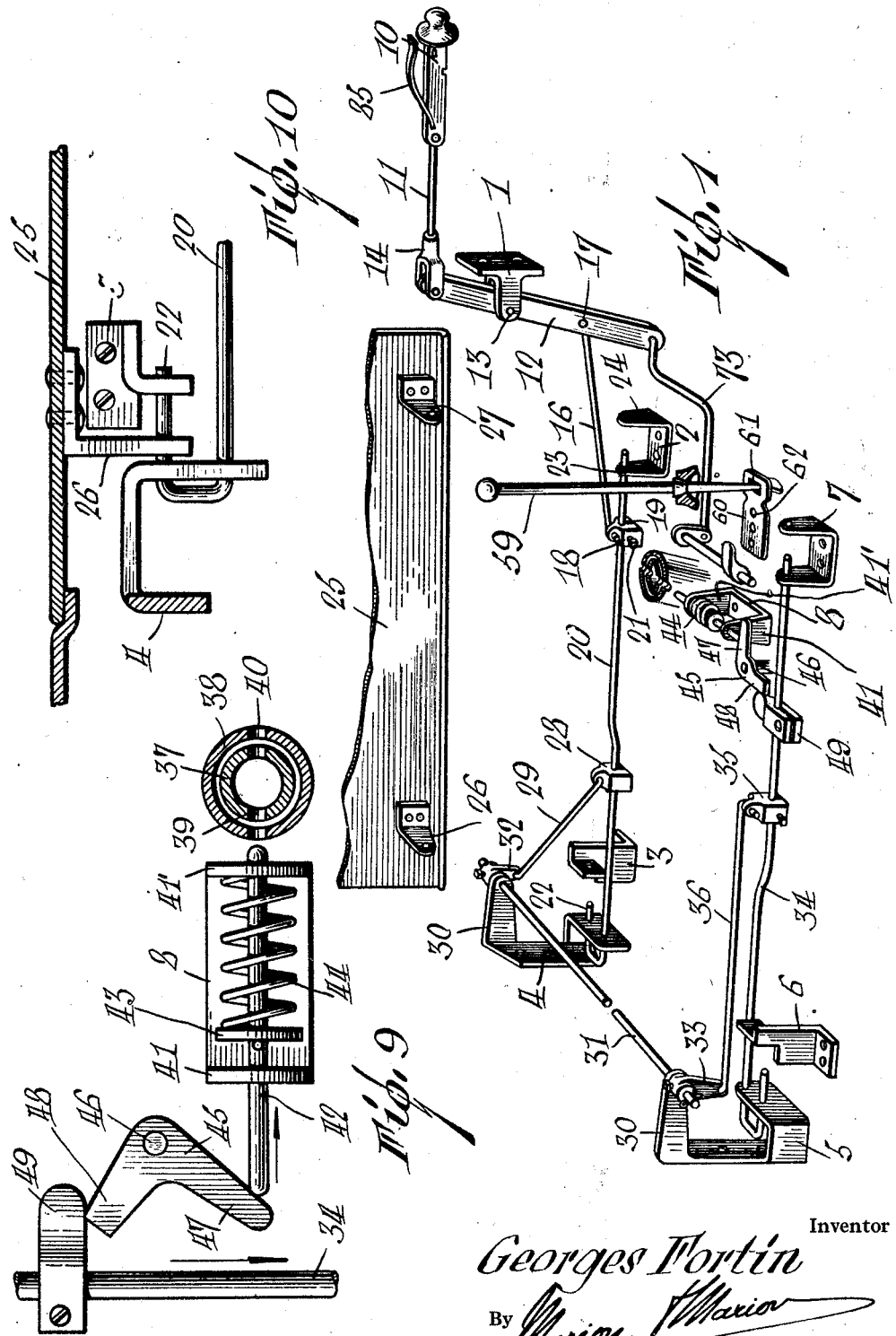

1,721,013

UNITED STATES PATENT OFFICE.

GEORGES FORTIN, OF QUEBEC, QUEBEC, CANADA.

LOCKING DEVICE FOR AUTOMOBILES.

Application filed September 2, 1926. Serial No. 133,255.

The present invention pertains to a novel locking device for automobiles and is designed to lock several parts of the vehicle by actuation of a single control bolt. Moreover, the operation of this bolt is in turn dependent on a single lock which also secures the position of the ignition switch. More specifically, the invention comprises locking rods, in combination with other locking devices, for securing the hood to the frame of the vehicle. On the dashboard is mounted a housing containing a lock, and in the housing is also mounted a bolt which is accessible from the driver's seat. By means of levers and links this bolt is connected to the locking rods in order to govern the position of them. Also, locking devices are provided for the steering post and transmission mechanism, and these devices are also controlled by the same locking bolt.

The lock housing on the dash-board contains a device for controlling the position of the ignition switch and is disclosed in my United States Patent No. 1,576,320 of March 9th, 1926, and the corresponding Canadian Patent No. 259,449 of March 30th, 1926. The locking mechanism for the ignition switch comprises a slide, movable from the exterior of the housing when the lock is opened. The housing further contains a latch, movable only with the slide, and adapted to lock the above mentioned operating bolt. It will therefore be seen that a single lock within the housing is used to secure the ignition switch and the operating bolt which in turn controls the hood lock, the steering post lock and the transmission lock.

The invention is fully disclosed in the following description and in the accompanying drawings in which:

Figure 1 is a perspective view of the locking apparatus;

Figure 2 is a longitudinal section of the lock housing, showing the position of parts prior to opening the switch;

Figure 3 is a section on the line 3—3 of Figure 2;

Figure 4 is a section on the line 4—4 of Figure 2;

Figure 5 is a perspective view of the lock housing;

Figure 6 is a detail vertical section of the locking device for the gear shifting lever;

Figure 7 is a section on the line 7—7 of Figure 6;

Figure 8 is a detail section of the lock housing;

Figure 9 is a detail horizontal section of the steering post, showing in elevation the steering post locking means; and Figure 10 is a detail section of one of the hood locks.

Reference to these views will now be made by use of like characters which are employed to designate corresponding parts throughout.

In Figure 1 is shown a forked bracket 1 adapted for attachment to a wall disposed in front of the dash-board of the automobile. Also, brackets 2, 3, 4, 5, 6, 7 and 8 are suitably secured to the frame of the vehicle at opposite sides of the motor. A lock housing 9 is also secured to the dashboard, and through the housing is passed a slidable bolt 10 having a rod 11 pivoted to the forward or inner end thereof. A lever 12 is pivoted as at 13 in the bracket 1 and has its upper end attached to a fork 14 secured to the forward end of the rod 11. A link 16 is pivoted as at 17 to the lever 12 at a point below the bracket and has its remaining end attached to a block 18 as shown in Figure 1. The block has a slot 19 in which a locking rod 20 is received, and the block may be clamped at any desired point on the rod by means of a set screw 21 passed through the slotted portion. The rod 20 passes through the brackets 2 and 4 and has its forward end bent inwardly as at 22 for passage through the bracket 3. It will be seen that the bracket 2 comprises two spaced ears 23 and 24 through which one end of the rod 20 may pass. Each end of the hood 25 carries a pair of apertured brackets 26 and 27. With reference to the pair shown in Figure 1, the member 26 is receivable between the brackets 3 and 4 and may be locked in this position by the end 22 of the rod 20. Similarly the bracket 27 is received between the ears 23 and 24 and is held by the remaining end of the rod.

In order to lock the other side of the hood, the rod 20 carries a block 28 similar to the member 18 and having a link 29 pivoted therein. The brackets 4 and 5 have parallel arms 30 in which is pivoted a shaft 31. The ends of the shaft carry fingers 32 and 33 secured thereto, and the member 32 receives the remaining end of the link 29. Another locking rod 34 is supported slidably in the brackets 5, 6 and 7 and carries a block 35 substantially opposite the member 28. The block 35 is connected by a link 36 to the finger 33. It will be apparent that when the bolt 10 is pushed inwardly, the link 16 will draw the rod 20 rearwardly of the vehicle so that the brackets 26 and 27 at this side are locked in a manner already described. Similar movement will be imparted through the link 29 and shaft 31 to the duplicate mechanism at the other side of the chassis, so that the hood brackets at this side will be locked in like manner within the brackets 7 and between the brackets 5 and 6.

At the same time an associated mechanism is actuated for locking the steering post 37 within the steering gear tubing 38. These members are formed with apertures 39 and 40 which come into alinement when the front wheels point straight ahead. The bracket 8 is formed with ears 41 and 41' in alinement transversely of the vehicle frame, and through these ears is passed a slidable pin 42 adapted to enter the apertures 39 and 40. Between the ears, the pin 42 carries a disc 43 which is engaged by one end of the spring 44 surrounding the pin, and the remaining end of the spring engages the ear 41'. This device normally holds the pin retracted from the apertures 39 and 40 as clearly shown in Figure 9. Adjacent the bracket 8, a bell crank lever 45 is pivoted to a stud 46 suitably mounted on the frame or another stationary part of the vehicle. One end 47 of the lever is in engagement with the outer end of the pin 42, and the other end 48 is engageable by a block 49 clamped to the rod 34. As this rod is brought into the locking position in the manner already described, the block 49 causes the lever 45 to push the pin 42 against the action of the spring 44 and into the apertures 39 and 40, whereby the steering post is locked to the tubing.

Still another mechanism also operable from the bolt 10, serves to lock the transmission. With reference to Figures 6 and 7, it will be seen that a U-shaped box 50 is secured to the housing 51 which encloses the transmission mechanism. Within the box is journaled a shaft 52 which carries a cam 53 and an exterior arm 54. The top 55 of the housing 50 is in the shape of a trough and has a bracket 56 secured to the under surface thereof. To this bracket is pivoted a finger 57, one end 58 of which is engageable by the cam.

At the lower end of the gear shifting lever 59 is provided a slide 60 having a slot 61 in which said end is received. This slide is also formed with a plurality of apertures 62. On the bottom 63 of the housing 50 is mounted a strap 64 through which the slide 60 may move. The slide is also passed through a suitably shaped guide 65 having stems 66 and 67 projecting from the top and bottom thereof into the top 55 and bottom 63 respectively of the box 50.

A pin 68 stands vertically in the box 50 and is adapted to slide through the top and bottom thereof as well as through the strap 64. It will also be seen that this pin may pass through any one of the apertures 62 in the slide 60. The pin carries a collar 69 and is partially surrounded by a spring 70 bearing against the collar and the top of the strap 64 so that the pin is normally released from the slide 60.

As already stated, one end 58 of the finger 57 is engaged by the cam 53, and the remaining end 71 is offset in order to clear the stem 66 and is further slotted as at 72 in order to straddle the pin 68 and bear upon the collar 69. Finally, the arm 54 carried by the shaft 52 outside the box 50 is joined to the lower end of the lever 12 by means of a suitably bent link 73.

The apertures 62 in the slide 60 are so positioned that, regardless of the adjustment of the lever 59, one of the apertures will be in alinement with the pin 68 which is normally lifted from the slide by the spring 70. When the key 10 is pushed inwardly to lock the parts already mentioned, the shaft 52 is turned through the medium of the link 73 and arm 54 whereby the cam 53 is raised. The forked end 71 of the finger 57 is thus depressed upon the collar 69, whereby the lower end of the pin 68 enters one of the apertures 62 against the action of the spring 70. In this manner the transmission mechanism is locked in a given position and theft of the car is now impossible since neither the steering mechanism nor gear shifting mentioned can be controlled, nor can access to the engine be obtained.

The locking parts within the housing 9 are constructed as a modification of the device shown in my United States Patent No. 1,576,320 of March 9th, 1926, and the corresponding Canadian Patent No. 259,449 of March 30th, 1926.

The conductor 135 leading to the magneto is passed through the housing 9 as clearly shown in Figure 2. This conductor has a brake within the housing in which is disposed the switch comprising a base 136 carrying a post 137 and a clip 138. To the post is pivoted a switch blade 139 adapted to enter the clip 138 and thereby close the brake.

Within the housing a lever 140 is pivoted to the front wall at a fixed point 141. The free end of the lever carries a knob 142 which projects through a slot 143 to the exterior of the housing. The lever is connected to the switch blade 139 by a pair of links 144 and 145 so that the lever controls the switch. The lever is normally held raised to closing position by means of the spring 146 bearing against it and also against a lug 147 secured to the wall of the housing. Within the housing is mounted a slide 150 in the shape of a yoke, and one end 148 thereof is suitably guided in a block 149. A stud 151 projects from the slide through a slot 154 in the front wall of the housing, and the outer end of the stud carries a knob 153 having a graduated hub 152. One end of the slide is connected to a lock bolt 132 adapted to enter and be locked within a lock casing 133. The other end carries a finger 155 adapted to be moved over the slot 143 and into the path of the lever 140 whereby said lever can not be moved to change the condition of the switch 136—139.

The pivoted end of the lever 140 has fixed thereto a lug 156 to which is attached a straight link 157. This link is also connected to an arm 158 which is pivoted to a fixed point 159 on the front wall of the housing. At this pivot point a curved link 160 is attached to the arm 158, and the other end of the link 160 is pivoted to a slotted link 161. On the slide 150 is mounted a pin 162 which extends into the slot 161' of the link 161.

When current is to be supplied in the magneto in the running of the automobile, the switch is closed and the finger 155 is brought over the slot 143. The lock 133 is now manipulated by means of the outside graduated knob 153' (Figure 5) to lock the parts in this position, whereby retraction of the lever 140 and opening of the switch are rendered impossible. After the automobile has been stopped and it is desired to open the switch, the lock is opened and the slide 150 is moved by means of the knob 153 to the position shown in Figure 2 in order to remove the finger 155 from the path of the lever 140. The lever is now brought downwardly by means of the knob 142. Upon turning of the lever about its pivot, the link 157 is shifted, causing rotation of the arm 158 and the curved link 160 attached thereto. The slotted link 161 is thereby moved towards the lock whereby the bolt 132 is inserted in the lock and the finger 155 again brought over the slot 143 to prevent return of the lever. In this position the lever can not be returned to close the switch unless the lock 133 is opened by use of the proper combination. It will be apparent that the foregoing constitutes an effective device for preventing theft of the automobile since the magneto circuit can not be closed without knowledge of the combination of the lock.

The rear wall 75 of the housing 9 is formed with a vertical ear 76 and horizontal ear 77 as shown in Figures 3 and 4. The slide 150 carries a finger 78 adapted for insertion in the ear 76, and the lever 140 is formed with a similar finger 79 adapted to enter the member 77. The fingers lock the rear wall 75 to the body of the housing 9, all depending on the lock 133, so that the housing can not be dismantled for unauthorized access to the working parts.

The spindle 151 passes loosely through a bolt 80 formed at one end with an inwardly extending finger 81 as shown in Figure 2. The bolt 10 has a notch 82 adapted to receive this finger whereby the various locking parts depending on the sliding of the bolt are held against movement. The bolt passes through a slot 83 in the front wall of the housing, and the lower edge of the key has a notch 84 adapted to receive the lower edge of the slot 83 to hold the bolt in withdrawn position as shown in Figure 4. Engagement between the notch 84 and lower edge of the slot 83 is assured by a spring 85 carried by the bolt and bearing against the top of the housing 9.

To the front wall of the housing is secured a pin 86 accommodated in a slot 87 cut through the bolt 80 in order not to impede adjustment of the latter. Between the yoke 150 and the bolt 80 the spindle 151 carries a disc 88 secured thereto by a screw 89 and having a slot 90 in its edge. After the lock 133 has been adjusted from the knob 153 in the manner already mentioned, the slot 90 must be brought into alinement with the pin 86 in order to permit the finger 81 of the bolt 80 to be withdrawn from the notch 82 in the key 10. This relation between the slot 90 and the pin 86 is procured when a given numeral on the hub 152 known to the operator, is made to coincide with a definite point indicated on the front wall of the housing 9. This relation may be changed from time to time as desired by loosening the screw 89 or altering the position of the disc 88 on the spindle 151.

It will be evident that the foregoing arrangement constitutes an effective means for locking, by means of a single lock, the hood of an automobile, the steering post, the transmission gear and the position of the ignition switch.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:

1. In combination with an automobile comprising a frame, a hood, a steering post and a tubing enclosing said post, brackets carried by said frame, brackets carried by said hood, locking rods slidable in the brackets on the frame and adapted to pass through the brackets on the hood, a pin slidably supported by the frame of the vehicle and adapted to enter said post and tubing, and an operative connection between said pin and one of said rods.

2. In combination with an automobile comprising a frame, a hood, a steering post and a tubing enclosing said post, brackets carried by said frame, brackets carried by said hood, locking rods slidable in the brackets on the frame and adapted to pass through the brackets on the hood, a pin slidably supported by the frame of the vehicle and adapted to enter said post and tubing, a bell crank lever pivotally carried by the vehicle and having one end in engagement with said pin, and a block carried by one of said rods and engaging the other end of said lever.

3. In combination with an automobile having a frame, a hood, and a gear shifting lever, brackets carried by said frame, brackets carried by said hood, locking rods slidable in the brackets on the frame and adapted to pass through the brackets on the hood, a lock for said gear shifting lever and operatively connected to said first named lever.

4. In combination with an automobile comprising a frame, a hood, a steering post, a steering tube enclosing said post, a gear shifting lever, brackets carried by said frame, brackets carried by said hood, locking rods slidable in the brackets on the frame and adapted to pass through the brackets on the hood, a pin slidably supported by the frame of the vehicle and adapted to enter said post and tubing, an operative connection between said pin and one of said rods, a lock for said gear shifting lever and operatively connected to said first named lever.

5. In combination with an automobile comprising a frame, a hood, a steering post, a steering tube enclosing said post, a gear shifting lever, brackets carried by said frame, brackets carried by said hood, locking rods slidable in the brackets on the frame and adapted to pass through the brackets on the hood, a pin slidably supported by the frame of the vehicle and adapted to enter said post and tubing, an operative connection between said pin and one of said rods, an apertured slide carried by the lower end of said gear shifting lever, the locking pin adapted to enter said slide, and an operative connection between said first named lever and said locking pin.

6. In combination with an automobile having a frame, a hood, and a gear shifting lever, brackets carried by said frame, brackets carried by said hood, locking rods slidable in the brackets on the frame and adapted to pass through the brackets on the hood, an apertured slide carried by the lower end of said gear shifting lever, a box carried by the vehicle, a pin slidably mounted in the box and adapted to enter said slide, a spring surrounding said pin and normally holding it out of the slide, a finger pivoted in said box and adapted to depress said pin into the slide, a shaft journaled in the box, a cam carried by said shaft and adapted to engage said finger and a connection between said shaft and the first named lever.

In witness whereof I have hereunto set my hand.

GEORGES FORTIN.